United States Patent
Chapman et al.

(10) Patent No.: US 11,868,975 B1
(45) Date of Patent: Jan. 9, 2024

(54) SYSTEMS AND METHODS FOR A BENEFICIARY PRE-APPROVAL

(71) Applicant: Wells Fargo Bank, N.A., San Francisco, CA (US)

(72) Inventors: Elise M. Chapman, San Francisco, CA (US); Autumn Krischer, San Francisco, CA (US); Sanjay Mishra, San Francisco, CA (US); Dove Vallender, San Francisco, CA (US); Sushil Kumar Vyas, Waxhaw, NC (US); Jeannette Woodbury, San Francisco, CA (US); Feiwen Xu, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 733 days.

(21) Appl. No.: 15/582,323

(22) Filed: Apr. 28, 2017

(51) Int. Cl.
*G06Q 20/10* (2012.01)
*G06Q 40/03* (2023.01)

(52) U.S. Cl.
CPC ............. *G06Q 20/10* (2013.01); *G06Q 40/03* (2023.01)

(58) Field of Classification Search
CPC ....... G06Q 40/08; G06Q 40/025; G06Q 40/00
USPC ...................................... 705/38, 39
See application file for complete search history.

(56) References Cited

U.S. PATENT DOCUMENTS

| | | | |
|---|---|---|---|
| 6,678,685 B2 | 1/2004 | McGill et al. | |
| 7,620,596 B2 | 11/2009 | Knudson et al. | |
| 7,689,450 B1 | 3/2010 | Dvorak et al. | |
| 7,689,483 B2 | 3/2010 | Wu et al. | |
| 7,778,903 B2 | 8/2010 | Weichert et al. | |
| 7,801,811 B1* | 9/2010 | Merrell ................. | G06Q 40/02 705/38 |
| 8,016,185 B2 | 9/2011 | Modi | |
| 8,082,210 B2 | 12/2011 | Hansen et al. | |
| 8,527,418 B2 | 9/2013 | Enzaldo et al. | |
| 8,650,072 B2 | 2/2014 | Mason et al. | |
| 8,676,700 B2 | 3/2014 | Holland | |
| 8,874,909 B2* | 10/2014 | Lutz .................... | G06F 21/6245 713/165 |

(Continued)

OTHER PUBLICATIONS

Wronka, C., 2022. Money laundering through cryptocurrencies—analysis of the phenomenon and appropriate prevention measures. Journal of Money Laundering Control, 25(1), pp. 79-94. (Year: 2022).*

(Continued)

*Primary Examiner* — Bruce I Ebersman
*Assistant Examiner* — John O Preston
(74) *Attorney, Agent, or Firm* — Foley & Lardner LLP

(57) ABSTRACT

According to one example embodiment, a computer implemented method performed by a funds transfer computing system, includes registering a beneficiary to a rating system. Registering the beneficiary comprises receiving identifying information including at least one of a receiving account, a financial institution associated with the receiving account, a beneficiary location, a beneficiary name, and an authentication factor. An identity of the beneficiary is validated in response to the received identifying information. A trust score for the beneficiary is generated. The trust score is (Continued)

indicative of the beneficiary's likelihood of being approved to receive funds in an international funds transfer between the beneficiary and a payor.

26 Claims, 5 Drawing Sheets

(56) References Cited

U.S. PATENT DOCUMENTS

| | | | |
|---|---|---|---|
| 2004/0024693 A1* | 2/2004 | Lawrence | G06Q 20/10 |
| | | | 705/38 |
| 2008/0301040 A1* | 12/2008 | Knudson | G06Q 40/025 |
| | | | 705/39 |
| 2011/0078007 A1 | 3/2011 | Chou et al. | |
| 2011/0251906 A1 | 10/2011 | Loevenguth et al. | |
| 2013/0247149 A1 | 9/2013 | Sanft et al. | |
| 2013/0268305 A1 | 10/2013 | Glennon et al. | |
| 2013/0268439 A1 | 10/2013 | Lowe | |
| 2013/0304630 A1 | 11/2013 | Meszaros | |
| 2014/0006284 A1 | 1/2014 | Faith et al. | |
| 2014/0095232 A1 | 4/2014 | Shiva et al. | |
| 2014/0244499 A1 | 8/2014 | Gruner | |
| 2014/0304047 A1 | 10/2014 | Maw et al. | |
| 2015/0112778 A1 | 4/2015 | Feldman et al. | |
| 2015/0120453 A1 | 4/2015 | Lee et al. | |
| 2015/0278940 A1 | 10/2015 | Jasko et al. | |

OTHER PUBLICATIONS

Fitzgerald, V., 2004. Global financial information, compliance incentives and terrorist funding. European Journal of Political Economy, 20(2), pp. 387-401. (Year: 2004).*

Galea, J., 2015. The Effect of Bitcoin on Money Laundering Law (Doctoral dissertation, University of Malta). (Year: 2015).*

Coffee Meets Bagel, Inc., Coffee Meets Bagel, Free Dating App, iTunes Preview, Apple App Store, available at least as early as May 22, 2015, retrieved from the Internet at https://itunes.apple.com/us/app/coffee-meets-bagel-cmb-bringing/id630119301?mt=8 on Jun. 29, 2016, 3 pages as printed.

MRK & Co., Dine-More Dates, Not Swipes, iTunes Preview, Apple App Store, available as early as Jun. 29, 2016, retrieved from the Internet at https://itunes.apple.com/ca/app/dine-more-dates-not-swipes/id964735828?mt=8 on Jun. 29, 2016, 2 pages.

Singh, K., 5 Dating Apps That Aren't Tinder And Are Still Worth Trying, The Huffington Post, Oct. 8, 2015, retrieved from the Internet at http://www.huffingtonpost.com/entry/best-dating-apps_us_560c09c2e4b0dd85030a1727 on Jun. 29, 2016, 7 pages as printed.

* cited by examiner

SYSTEMS AND METHODS FOR A BENEFICIARY PRE-APPROVAL

BACKGROUND

With the rise of globalization, the number of international financial transactions is enormous. These transactions, occurring between multiple parties in multiple countries, can be complex to process due to differing financial requirements and regulations associated with different countries. Often, this can lead to transactions failing to be processed, requiring the transactions to be submitted again, requiring additional time to process, and, potentially, incurring fees and other costs associated with performing the transaction. One common point of failure in international transactions is a failure on the part of the beneficiary or originator to provide the requisite information needed for the requirements and regulations associated with the countries involved in the international funds transfer. Relatedly, another common point of failure is the beneficiary or originator being on a country-specific or international "watch list," (e.g., for the country lacking the requisite information, the beneficiary or originator having risky or potentially illegal credentials, etc.) which can result in stopped transactions. For example, certain countries may require additional information from a beneficiary resulting in the beneficiary's placement on a watch list. Having to check the beneficiary status with one or more watch lists (or related databases) results in the transaction being slowed or, potentially, unable to be processed, requiring the transaction to be performed again once the watch list issue has been resolved. However, in some instances the beneficiary or originator may not be fully aware of why the transaction failed resulting in yet another failure or an increased delay in the funds transfer.

SUMMARY

According to one example embodiment, a computer implemented method performed by a funds transfer computing system, includes registering a beneficiary to a rating system. Registering the beneficiary comprises receiving identifying information including at least one of a receiving account, a financial institution associated with the receiving account, a beneficiary location, a beneficiary name, and an authentication factor. An identity of the beneficiary is validated in response to the received identifying information. A trust score for the beneficiary is generated. The trust score is indicative of the beneficiary's likelihood of being approved to receive funds in an international funds transfer between the beneficiary and a payor.

According to another example embodiment a system for managing the beneficiary pre-approval system. The beneficiary pre-approval computing system comprises a storage location comprises a plurality of beneficiaries. The system further comprises a processor and instructions stored in non-transitory machine-readable media. The instructions are configured to cause the beneficiary computing system to register a beneficiary to a rating system. Registration comprises receiving identifying information including at least one of a receiving account, a financial institution associated with the receiving account, a beneficiary location, a beneficiary name, and an authentication factor. An identity of the beneficiary is validated in response to the received identifying information. A trust score is generated for the beneficiary. The trust score is indicative of the beneficiary's likelihood of being approved to receive funds in an international funds transfer between the beneficiary and a payor.

These and other features, together with the organization and manner of operation thereof, will become apparent from the following detailed description when taken in conjunction with the accompanying drawings.

DETAILED DESCRIPTION

Figure 1:
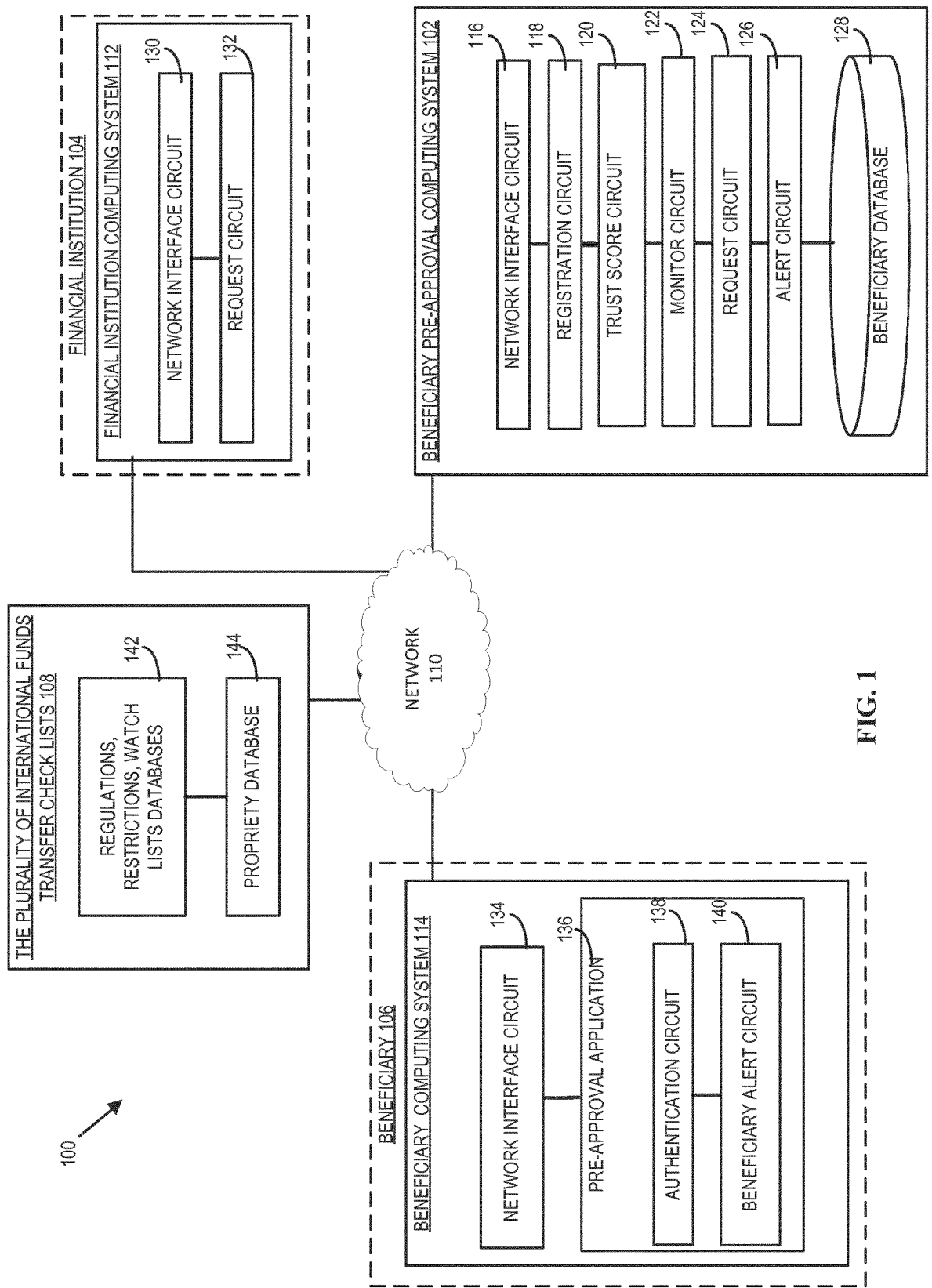
FIG. 1 is a schematic diagram of a beneficiary pre-approval system, according to an example embodiment.

Globalization has increased the amount of international transactions that occur every day. However, even in the globalized economy, many countries continue to have individual regulations, requirements for international transactions, and "watch lists" for beneficiaries (e.g., payment recipients), which can lead to failed international funds transfers. For example, a transfer may be rejected if the originator fails to include all necessary information of the beneficiary or when a beneficiary's actions result in their addition to one or more watch lists. Further, where the transaction involves multiple transactions, the entire batch of transactions may be rejected due to missing information. This can result in the transactions not occurring in a timely fashion or not occurring at all. Additionally, the financial institutions involved in failed transactions may impose fees associated with a transaction's failure.

Referring generally to the figures, systems and methods for providing a beneficiary pre-approval system are shown in various embodiments. According to various embodiments, the beneficiary pre-approval system maintains a database of enrolled beneficiaries and generates a trust score indicative of beneficiary's likelihood of being approved to receive funds in an international funds transfer between the beneficiary and an originator (e.g., payor). As understood in the field, the originator is the payor (e.g., the person or entity paying funds) and the beneficiary is the payee (e.g., the person or entity receiving funds). The beneficiary pre-approval system can monitor and adjust the trust score for the enrolled beneficiaries and alert the beneficiary of a change to the trust score that may inhibit or delay an international funds transfer. Additionally, the beneficiary pre-approval system determines the likelihood of the beneficiary clearing a plurality of international funds transfer check lists required for an international funds transfer to the beneficiary. The plurality of international funds transfer check lists includes, for example, the Office of Foreign Assets Control list, Bank Secrecy Act, country-specific restriction list, country-specific regulations, anti-money laundering list, and international regulations.

The embodiments described herein alleviate the time uncertainty and inconvenience associated with conducting international funds transfers. Specifically, the beneficiary pre-approval system determines—prior to an international funds transfer to the beneficiary—the likelihood that an international funds transfer to the beneficiary would be approved if the financial institution were to conduct each relevant country and regulatory checks and international or country-specific watch lists (herein collectively referred to as "plurality of international funds transfer check lists") at the time of the funds transfer. Additionally, the beneficiary pre-approval system provides real-time monitoring, alerts, and feedback into the status of the beneficiary in regard to the plurality of international funds transfer check lists. The beneficiary pre-approval system reduces transactional failures and delays associated with incomplete information being provided by the originator, the beneficiary's inclusion on one or more watch lists and required checks of the watch lists, and the like. Thus, the beneficiary pre-approval system provides a pre-international funds transfer evaluation of a beneficiary.

FIG. 1 is a schematic diagram of a beneficiary pre-approval system 100, according to an example embodiment. The beneficiary pre-approval system 100 includes a beneficiary pre-approval computing system 102, a financial institution computing system 112, a beneficiary computing system 114, and a plurality of international funds transfer check lists 108. The financial institution computing system 112 is operated by a financial institution 104. In some arrangements, the financial institution 104 subscribes to or is a member of the services provided by the beneficiary pre-approval computing system 102. In other arrangements, the financial institution 104 operates the beneficiary pre-approval computing system 102. In such arrangements, the beneficiary pre-approval computing system 102 may be combined with the financial institution computing system 112. The beneficiary computing system 114 is operated by a beneficiary 106 enrolled in the services provided by the beneficiary pre-approval computing system 102. For example, the beneficiary computing system 114 may be a personal computer or a smartphone associated with the beneficiary 106. Each of the beneficiary pre-approval computing system 102, the financial institution computing system 112, the beneficiary computing system 114, and the plurality of international funds transfer check lists 108 are in operative communication with each other via a network 110. The network 110 includes, for example, the Internet, cellular networks, proprietary banking networks, and the like. In some arrangements, the financial institution computing system 112 and the beneficiary pre-approval computing system 102 are in communication via a secure network or intranet, such as an internal banking network associated with the financial institution(s) 104 subscribed to the beneficiary pre-approval system 100.

The beneficiary pre-approval computing system 102 provides services to both the financial institution 104 and the beneficiary 106. As described in greater details below, the beneficiary pre-approval computing system 102 allows for a financial institution 104 to bypass the plurality of international funds transfer check lists and complete an international funds transfer shortly after the financial institution 104 receives the request. Additionally, the beneficiary pre-approval computing system 102 allows for a beneficiary 106 to monitor and review the ability of the beneficiary 106 to pass the plurality of international funds transfer check lists for an international funds transfer.

Generally, the financial institution 104 uses the services provided by the beneficiary pre-approval computing system 102 to obtain a trust score associated with a beneficiary 106 of an international funds transfer involving the financial institution 104. The trust score is determined by the beneficiary pre-approval computing system 102 and is indicative of the beneficiary's 106 likelihood of being approved to receive funds in an international funds transfer between the beneficiary 106 and an originator. Depending on the trust score, the financial institution 104 may decide to bypass the time consuming checks and cross checks of the plurality of international funds transfer check lists 108 and approve the international fund transfer based on the trust score. In some arrangements, the financial institution 104 compares the trust score of the beneficiary 106 to a threshold trust score in deciding to bypass the checks. Generally, the beneficiary 106 uses the beneficiary pre-approval system 100 to enroll into the beneficiary pre-approval system 100 and monitor their trust score, both for non-transaction specific cases (e.g., a soft check) and for transaction or country specific transactions (e.g., a hard check). By providing trust scores for beneficiaries the originator, financial institution 104, and/or beneficiary 106 can quickly determine if (or in some arrangements, the likelihood) the international funds transfer to the beneficiary 106 would clear all necessary checks. Accordingly, the embodiments described herein solve the technical and internet-centric problem of providing a global transactional platform to allow for easier, more accurate, and more reliable (i.e., completed a higher percentage of the time the first time the transaction is submitted) international transaction requests.

The beneficiary pre-approval computing system 102 includes a network interface circuit 116, a registration circuit 118, a trust score circuit 120, an alert circuit 126, and a beneficiary database 128. Although shown in FIG. 1 as each being separate circuits, any of the registration circuit 118, the trust score circuit 120, the monitor circuit 122, the request circuit 124, and/or the alert circuit 126 can be combined. The beneficiary pre-approval computing system 102 may, for example, include one or more servers each with one or more processors configured to execute instructions stored in a memory, send and receive data stored in the memory, and perform other operations to implement the financial services described herein associated with the processing modules, databases, and processes. In some arrangements, the beneficiary pre-approval computing system 102 is managed by the financial institution 104 and part of the financial institution computing system 112. In other arrangements, the beneficiary pre-approval computing system 102 is affiliated with an entity other than the financial institution 104. The network interface circuit 116 facilitates data communications to and from the network 110. In some arrangements, data passing through the network interface circuit 116 is encrypted.

The registration circuit 118 is structured to register a beneficiary 106 with the beneficiary pre-approval computing system 102 to generate a profile for the beneficiary 106 ("beneficiary profile"). Generally, the registration circuit 118 captures beneficiary 106 information and verifies the information. The beneficiary information includes beneficiary name, address, tax ID number, phone number, FDIC number, bank identification number ("BIN") associated with beneficiary accounts, routing number, or other information relating to the identity of the beneficiary 106. The registration process is explained in greater detail below with respect to method 200 of FIG. 2.

The trust score circuit 120 is structured to generate, maintain, and transmit the trust scores for a plurality of beneficiaries. The trust score circuit 120 includes a monitor circuit 122 and a request circuit 124. The trust score circuit 120 is in communication with the plurality of international funds transfer check lists 108 to generate and update the trust scores for the plurality of beneficiaries. The trust score circuit 120 can be configured to communicate with one or more databases or other repositories over the network 110 to access information related to the beneficiary 106. The trust score circuit 120 is in communication with the registration circuit 118 to retrieve beneficiary identifying information and generate a trust score. The trust score circuit 120 is in communication with the beneficiary database 128 to store and update trusts scores associated with the plurality of beneficiaries.

The trust score circuit 120 is configured to assign a score to each beneficiary 106 enrolled in the beneficiary pre-approval system. As stated above, the trust score is indicative of the beneficiary's 106 likelihood of being approved to receive funds in an international funds transfer between the beneficiary 106 and an originator. In some arrangements, the trust score is also indicative of at least one of beneficiary credit score, beneficiary account profile, beneficiary fraud risk, previous funds transfers related to the beneficiary, criminal record associated with the beneficiary, tax information for the beneficiary, customer feedback associated with the beneficiary, or the like. In other arrangements, verified financial information or previous transactions—catalogued by the financial institution computing system 112 and shared or captured by previous interactions with the beneficiary pre-approval computing system 102 involving the beneficiary 106—may be analyzed to provide a more robust trust score for the beneficiary 106. In some arrangements, the trust score varies with the funds transfer details or, in other words, the beneficiary 106 may be cleared to receive funds under the regulations and restrictions that govern one transaction, but not under the regulations and restrictions that govern a second transaction. For example, the beneficiary 106 may be on a country-restriction list for Germany and, as a result, any funds transfer originating or received in a financial institution 104 in Germany will have a lower transaction specific trust score than a transaction specific trust score for a funds transfer originating or received in another country.

As will be appreciated, the trust score is a value indicative of a level of confidence that the beneficiary 106 would pass all the relevant checks and lists in the plurality of international funds transfer check lists in the plurality of international funds transfer check lists 108. In some arrangements, the level of confidence is based at least in part on the variety of data sources used for generating the trust score. In some arrangements, the level of confidence is based at least in part on a degree of consistency in the data received from a variety of sources in the database. For example, if one of the relevant watch lists has not been updated in over a year, the trust score may be lowered. Thus, financial institution 104 may use the trust score to accurately and confidently assess a risk level of the financial institution 104 bypassing the time consuming check of the beneficiary 106 against the plurality of international funds transfer check lists. For transaction specific trusts scores, the trust score circuit 120 may be configured to assign a score specific to each funds transfer request. In some arrangements, the trust score may be associated with the number of defects associated with each funds transfer request. For example, the trust score may reflect the number of defects in a given funds transfer, such that a trust score of two would indicate that there were two defects and/or potential issues with the beneficiary 106.

The trust score circuit 120 may generate a trust score of a numerical value on a scale, such as one to ten, where ten represents a high-likelihood, and one equals the lowest likelihood. While the above examples describe a numerical score, other types of scores may be generated such as letter scores (e.g. A, B, C, D, F), word scores (e.g. excellent, good, average, below average, poor, etc.), a pass/fail string, or other score types that convey an evaluation indicative of the beneficiary's 106 likelihood of being approved to receive funds in an international funds transfer between the beneficiary 106 and an originator.

The monitor circuit 122 is structured to examine the plurality of international funds transfer check lists 108 and adjust—if needed—the trust score of the beneficiary 106. Generally, the monitor circuit 122 is structured to monitor data that is required by the beneficiary 106 to process the requested financial transaction. The data may include country specific information, receiving financial institution specific information, information that is required for specific transaction in a given country, and the like. The monitor circuit 122 also alerts the beneficiary 106 regarding an adjustment to the trust score of the beneficiary 106. The monitoring process is explained in greater detail below in method 400 of FIG. 4.

The request circuit 124 is structured to receive a trust score query in response to a funds transfer request to the beneficiary 106 and structured to transmit the trust score for the given query. The trust score query, for example, may be received from the financial institution computing system 112. The trust score query includes an identification of the beneficiary 106 and the requesting financial institution 104. The identification of the beneficiary 106 can be the actual name of the person or entity, a unique user identifier, or similar identification types. In some arrangements, the trust score query includes transaction specific information identifying one or more of a transaction type, transaction amount, beneficiary account information, and originator account information. Example transaction types can include transfers of funds, transfers of other financial instruments (securities, bonds, etc.), requests for payment, credit based transactions, loan requests, invoice payments, currency swap, etc. The originator account information includes information relating the accounts involved with the transaction, such as account numbers, routing numbers, account balances, or other information related to the account of the originator to be used to process the transaction. The beneficiary information includes data related to the beneficiary 106, such as the name of the beneficiary 106, country of the beneficiary 106, an account of the beneficiary 106, a financial institution associated with the beneficiary 106, or other information related to the beneficiary 106. The operation of the request circuit 124 is described in further detail below with respect to FIG. 3.

Still referring to FIG. 1, the alert circuit 126 is structured to generate and transmit alerts to the beneficiary 106. The alert circuit 126 is in communication with the beneficiary alert circuit 140 of the beneficiary computing system 114 via the network 110. The alert circuit 126 alerts the beneficiary 106 of an adjustment to the trust score of the beneficiary 106. In some arrangements, the alert circuit 126 alerts the beneficiary 106 of a failed or declined funds transfer due to a low trust score. The alert relating to a failed or declined funds transfer may further provide a list of reasons why the request failed to allow the beneficiary 106 to correct the defects for a subsequent funds transfer. In some arrangements, the alert circuit 126 will not alert the beneficiary 106 to a change in status or failed funds transfer because the change or failure is responsive to the beneficiary 106 being added to a "secret" list (e.g., a terrorist watch list). In some arrangements, the alert circuit 126 may generate an alert with a query to the beneficiary 106 requesting more info. For example, a country changes requirements and now a beneficiary Social Security Number ("SSN") is needed to complete the international funds transfer. The alert circuit 126 generates the alert and a query for the SSN and transmits it to the beneficiary alert circuit 140 of the beneficiary computing system 114. The alert circuit 126 receives a reply from the beneficiary 106 that includes the SSN information requested.

The beneficiary database 128 is configured to store a number of characteristics associated with the beneficiary 106 generated at the time of registration and the current trust score of the beneficiary 106. For example, the beneficiary profile may be generated when the beneficiary 106 enrolls in the beneficiary pre-approval system through the registration circuit 118. In one embodiment, the beneficiary profile may contain characteristics associated with the beneficiary 106 such as personal identifying information (name, address, SSN etc.), financial information (checking accounts, savings accounts, credit card accounts, money market accounts, etc.), asset information, previous transaction information, or any other information related to interactions between the beneficiary 106 and financial institution 104.

The plurality of international funds transfer check lists 108 includes a regulations, restrictions, and watch list database 142 and a propitiatory database 144. Although shown in FIG. 1 as each being separate circuits, any of the regulations, restrictions, and watch list database 142 and/or the propitiatory database 144 can be combined. The regulations, restrictions, and watch list database 142 can include country specific regulations (e.g., limiting the receipt of funds from certain sources or entities), country specific funds transfer requirements (e.g., require beneficiary information needed to receive funds), country-specific watch lists (e.g., list of beneficiaries not allowed to receive funds in a financial institution residing in that country), international watch list (e.g., known and recognized terrorist watch lists), and the like. For example, the regulations, restrictions, and watch list database 142 can include the Office of Foreign Assets Control list, the Bank Secrecy Act, Specially Designated Nationals List, and the Sanction List Search. The propitiatory database 144 includes databases not generated by a federal or state entity (e.g., a database of credit reports).

The financial institution computing system 112 includes a network interface circuit 130 and a financial institution request circuit 132. The financial institution computing system 112 may, for example, include one or more servers each with one or more processors configured to execute instructions stored in a memory, send and receive data stored in the memory, and perform other operations to implement the financial services described herein associated with the processing modules, databases, and processes. In some arrangements, the financial institution computing system 112 also includes the beneficiary pre-approval computing system 102. The network interface circuit 130 facilitates data communications to and from the network 110. In some embodiments, data passing through the network interface circuit 130 is encrypted.

The financial institution request circuit 132 is structured to communicate with the request circuit 124 of the beneficiary pre-approval computing system 102 and retrieve a trust score for a beneficiary 106. In some arrangements, the financial institution request circuit 132 is structured to capture a plurality of funds transfer details including the intended beneficiary 106, funds transfer amount, and beneficiary bank location. The financial institution request circuit 132 is structured to transmit the plurality of funds transfer details to the beneficiary pre-approval computing system 102 in order to retrieve the trust score. Depending on the preference of the financial institution 104, the financial institution request circuit 132 will retrieve a "sliding scale" trust score indicative of the likelihood the beneficiary 106 would pass all the plurality of international funds transfer check lists, thereby allowing the financial institution 104 to determine whether the score is adequate to bypass the plurality of international funds transfer check lists. Alternatively, and for ease of use, the financial institution request circuit 132 will retrieve a binary result indicating that the trust score is in accordance with the preferences of the financial institution 104 has established with the beneficiary pre-approval computing system 102 in regard to "acceptable" trust scores. The operation of the request circuit 132 is described in further detail below with respect to FIG. 3.

The beneficiary computing system 114 includes a network interface circuit 134 and a pre-approval application 136. Generally, the beneficiary 106 uses the beneficiary pre-approval system 100 to enroll into the beneficiary pre-approval system 100 and monitor their trust score, both for non-transaction specific cases (e.g., a soft check) and for transaction or country specific transactions (e.g., a hard check). The beneficiary computing system 114 may be any device associated with the beneficiary 106 that can communicate with the network 110, the financial institution computing system 112, and/or the beneficiary pre-approval computing system 102. In some embodiments, the beneficiary computing system 114 may include a user interface on an internet accessible website. In other embodiments, the beneficiary computing system 114 may be a mobile device associated with the beneficiary 106. Example mobile devices can include smartphones (e.g., iPhone®, Android® phones, Windows® phones, etc.), tablet computers (e.g., iPad®, Android® tablet, Microsoft Surface®, etc.), laptop computers, wearable device, or any other device capable of communicating with the network 110, financial institution computing system 112, and/or the beneficiary pre-approval computing system 102. The network interface circuit 134 facilitates data communications to and from the network 110. In some embodiments, data passing through the network interface circuit 134 is encrypted.

The pre-approval application 136 is structured to facilitate the beneficiary's 106 access to his or her associated trust score and associated beneficiary profile in the beneficiary database 128 of the beneficiary pre-approval computing system 102. The pre-approval application 136 includes an authentication circuit 138 and a beneficiary alert circuit 140. Although shown in FIG. 1 as each being separate circuits, any of the authentication circuit 138 and/or the beneficiary alert circuit 140 can be combined. Through the pre-approval application 136, the beneficiary 106 can receive alerts in regard to changes to the trust score via the beneficiary alert circuit 140, can authenticate via the authentication circuit 138 to access the beneficiary's 106 pre-approval profile, and can perform soft and hard checks on the beneficiary's 106 profile. In some arrangements, the pre-approval application 136 includes a user interface for the beneficiary 106 provides inputs and outputs within the beneficiary computing system 114. For example, the user interface may be a touchscreen display associated with mobile device, such as a smartphone or tablet PC. In other examples, the user interface may be a combination of a display and a separate input device, such as a keyboard. In still further examples, the user interface may be an audio interface, such as a virtual assistant such as Apple's ° Siri, ° or other virtual assistants.

The authentication circuit 138 is structured to facilitate the authentication of the beneficiary 106. For example, the beneficiary 106 logs into his or her existing financial institution account by providing the beneficiary pre-approval computing system 102 the correct log in credentials (e.g., a username and password) through the authentication circuit 138. Authentication can include entering a password, providing a biometric identifier, replying to an SMS message, and the like. Once authenticated, the beneficiary 106 can access their trust score and beneficiary profile information. For example, the beneficiary 106 may perform a holistic check on the associated trust score in the form of a soft check. This allows the beneficiary 106 to determine if his or her status on any of the watch lists (e.g., country restricted lists, OFAC, etc.) has changed to prevent or slow receipt of a funds transfer. Additionally, the beneficiary 106 can perform a hard check of the beneficiary's 106 trust score by retrieving the trust score for a "mock" transaction of an amount, from an originator, to a financial institution in a country. Through the soft and hard check options, the pre-approval application 136 provides the beneficiary 106 with an up-to-date view of the status of the beneficiary 106. Additionally, the beneficiary 106 may review the profile information for accuracy. For example, by adjusting a receiving account, a financial institution associated with the receiving account, a beneficiary location, a beneficiary name, and change the authentication factor. The authentication circuit 138 may be formed at least in part by web browser (e.g., Safari®, Chrome®, Internet Explorer®, etc.) configured to receive and display web pages received from the beneficiary pre-approval computing system 102. In other arrangements, the authentication circuit 138 is formed, at least in part, by a dedicated application (e.g., a smartphone application), a text message interface, or another program executed locally on the beneficiary computing system 114 suitable for communicating with the beneficiary pre-approval computing system 102 over the network 110.

The beneficiary alert circuit 140 is structured to facilitate receiving alert messages and generating responses to the beneficiary 106 in regard to adjustments to the beneficiary's 106 trust score. The beneficiary alert circuit 140 receives alerts generated from the alert circuit 126 of the beneficiary pre-approval computing system 102. Upon receipt of the alert, the beneficiary alert circuit 140 generates a notification on the beneficiary computing system 114. For example, a pop-up notification on a mobile device displaying "Adjustment to Trust Score," with a clickable prompt to initiate authentication and/or access to the beneficiary's 106 profile. The beneficiary alert circuit 140 facilitates the beneficiary's 106 responses to the received alert.

Figure 2:
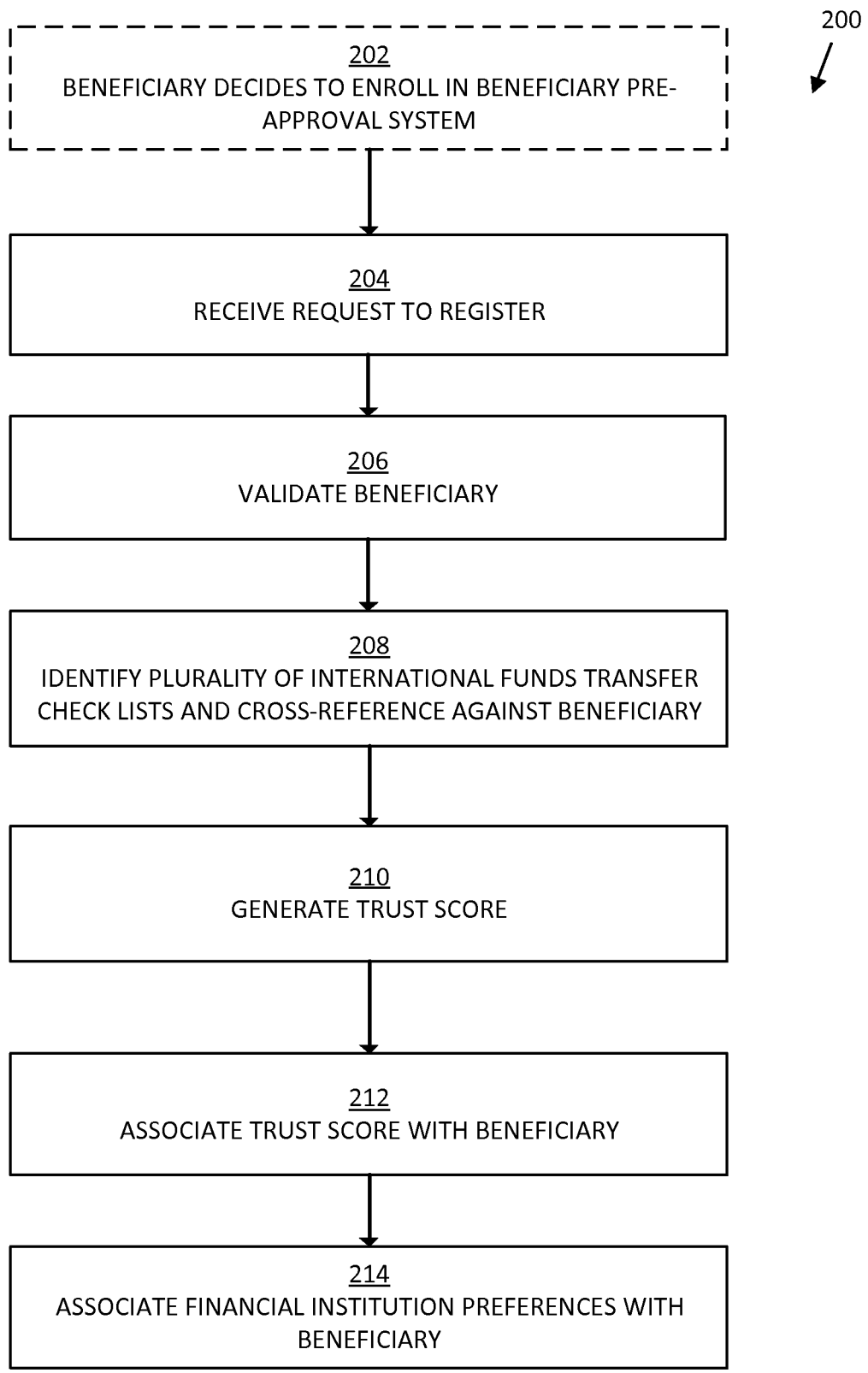
FIG. 2 is a flow diagram of a method of registering with the beneficiary pre-approval system, according to an example embodiment.

Referring to FIG. 2, a flow diagram of a method 200 of registering with the beneficiary pre-approval system. The method 200 is shown from the view of the beneficiary pre-approval system in connection with a beneficiary registering for the beneficiary pre-approval service. The method 200 is performed by a beneficiary pre-approval computing system receiving the beneficiary enrollment information from a beneficiary computing device (e.g., mobile device) or from the financial institution computing system. For example, the beneficiary may be the beneficiary 106 who operates the beneficiary computing system 114 of FIG. 1, the beneficiary pre-approval computing system may be the beneficiary pre-approval computing system 102 of FIG. 1, and the financial institution computing system may be the financial institution computing system 112 of FIG. 1. The beneficiary pre-approval service may be one offered by the entity that operates the beneficiary pre-approval computing system 102 of FIG. 1. However, the method 200 may be similarly performed by other systems and devices.

The method 200 begins with the beneficiary deciding to enroll in a beneficiary pre-approval system at 202. The beneficiary enrollment information is received by the beneficiary pre-approval computing system 102 from the beneficiary computing system 114. Additionally, the beneficiary enrollment information could be received from the financial institution computing system 112 that has the beneficiary 106 as a customer. In some arrangements, the beneficiary may decide to enroll in the beneficiary pre-approval system as a requirement for banking with a financial institution. In other arrangements, the beneficiary may enroll in the beneficiary pre-approval system to expedite international funds transfers.

At 204, the beneficiary pre-approval system receives a request to register a beneficiary from the beneficiary system. The register request is received by the beneficiary pre-approval computing system 102 from the beneficiary computing system 114. Additionally, the register request could be received from the financial institution computing system 112 that has the beneficiary 106 as a customer. The request to register includes identifying information of the beneficiary. The identifying information may include at least one account at a financial institution for receiving funds transfers, the beneficiary's name, the beneficiary's date of birth, a State-issued identifier, and transaction history associated with each of the of receiving accounts. The accounts may include savings accounts, checking accounts, credit card accounts, or any other type or form of financial account. In some arrangements, the identifying information may correspond to at least one of previous funds transfers related to the beneficiary, criminal records associated with the beneficiary, tax information for the beneficiary, and customer feedback associated with the beneficiary. In other arrangements, the identifying information may correspond to a beneficiary credit score, a beneficiary account profile, and a beneficiary fraud risk. In some arrangements, the request to register may be transmitted from the financial institution computing system 112 that possesses the identifying information of the beneficiary.

At 206, the beneficiary is validated by the beneficiary pre-approval system. The validation is performed by the beneficiary pre-approval computing system 102. Validation of the beneficiary can include vetting the beneficiary's identifying information to check for inconsistencies, performing a background check, requiring enrollment of biometrics, and the like. In some arrangements, the beneficiary may enroll in the beneficiary pre-approval system remotely, for example over the Internet. In those arrangements, the beneficiary may be required to travel to a nearby branch or institution associated with the beneficiary pre-approval system in order to complete validation of the beneficiary. In some arrangements, once the beneficiary is validated the beneficiary determines log in credentials (e.g., username, passcode, biometrics, mobile device, etc.) to perform hard checks of the trust score, soft checks of the trust score, receive alerts, respond to alerts, and the like.

At 208, a plurality of international funds transfer check lists are identified and the beneficiary is cross-referenced with the identified lists by the beneficiary pre-approval system. The cross-referencing is performed by the beneficiary pre-approval computing system 102. The plurality of international funds transfer check lists may be similar to the plurality of international funds transfer check lists 108 of FIG. 1. The plurality of international funds transfer check lists are databases that are used to determine the trust score of the beneficiary and the beneficiary's ability to clear the plurality of international funds transfer check lists for a given future international funds transfer.

At 210, the beneficiary pre-approval system generates the trust score of the beneficiary. The generation of the trust score is performed by the beneficiary pre-approval computing system 102. Generally, the trust score is indicative of the beneficiary's likelihood of being approved to receive funds in an international funds transfer between the beneficiary 106 and an originator. In some arrangements, the trust score varies with the funds transfer details, in other words, the beneficiary 106 may be cleared to receive funds under the regulations and restrictions that govern one transaction but not under the regulations and restrictions that govern a second transaction. In some arrangements, the trust score may be a level of confidence indicative of the variety of sources in the plurality of international funds transfer lists and a degree of consistency in the data received from those sources. In other arrangements, the trust score is a numerical value on a scale (e.g., 1, 2, 3 . . . 10), letter scores (e.g. A, B, C, D, F), word scores (e.g. excellent, good, average, below average, poor, etc.), or other score types that convey an evaluation indicative of the beneficiary's likelihood of being approved to receive funds in an international funds transfer between the beneficiary and an originator. The generation of the trust score is discussed above in regard to the trust score circuit 120 of the beneficiary pre-approval computing system 102 of FIG. 1.

At 212, the generated trust score is associated with the beneficiary by the beneficiary pre-approval system and stored in a database within the system. The association is performed by the beneficiary pre-approval computing system 102. In some arrangements, a beneficiary token is generated. The beneficiary token is associated with the identity of the beneficiary and obscures the identity of the beneficiary such that the beneficiary token keeps the identity of the beneficiary anonymous when the trust score is subsequently transmitted to certain entities.

At 214, the trust score preferences of the one or more financial institution's associated with the beneficiary are associated by the beneficiary pre-approval system with the beneficiary profile stored in the database within the system. The association of the preferences is performed by the beneficiary pre-approval computing system 102. The financial institution's beneficiary preferences can include the financial institution determining the form of the trust score, either as a level of confidence or as a binary response string. In arrangements where the level of confidence is selected, the financial institution will receive a value indicative of the beneficiary's likelihood of being approved to receive funds in an international funds transfer between the beneficiary and an originator. Once received, the financial institution makes a determination on whether the trust score for the beneficiary is sufficient to bypass the plurality of international funds transfer checklists. In arrangements where the binary response string is selected, the financial institution determines a threshold and/or characteristics of an acceptable trust score, the financial institution receives a "pass" or "fail" (or similar binary) message indicative of the whether the trust score associated with the beneficiary met the financial institution's parameters of an acceptable trust score.

Figure 3:
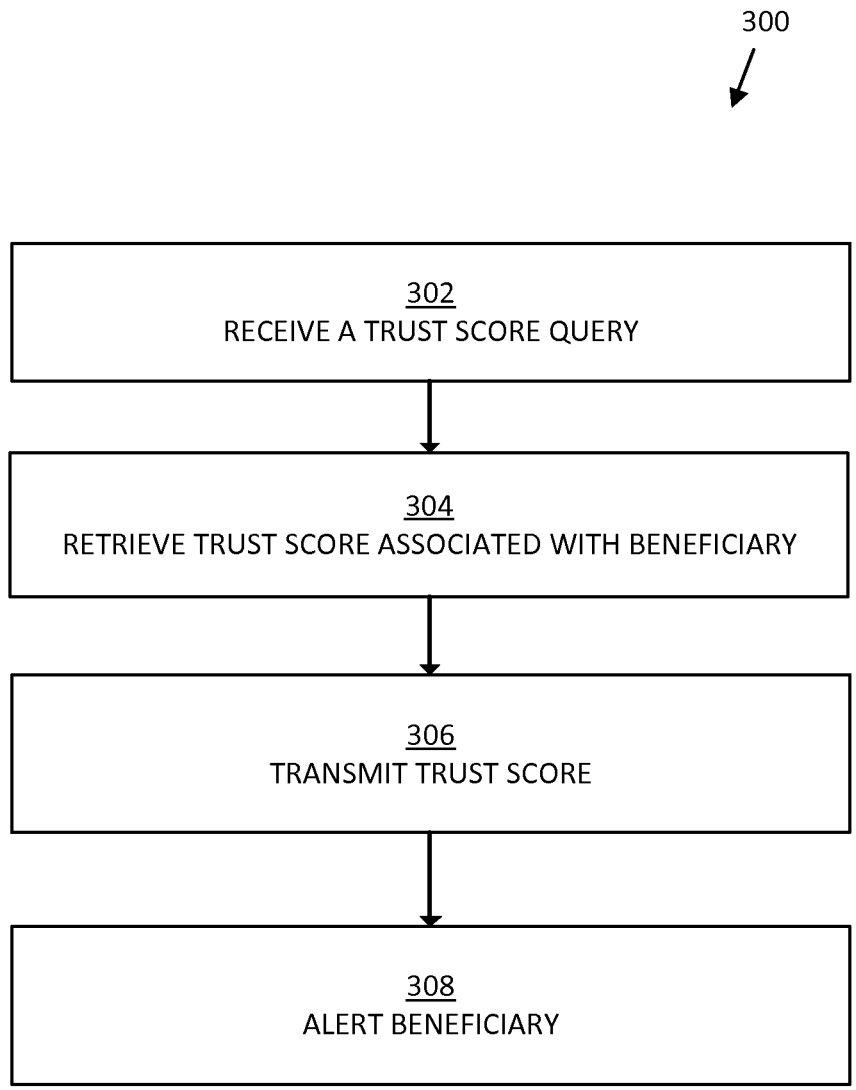
FIG. 3 is a flow diagram of a method of requesting a trust score with the beneficiary pre-approval system, according to an example embodiment.

Referring to FIG. 3, a flow diagram of a method 300 of requesting a trust score with the beneficiary pre-approval system is shown, according to an example embodiment. The method 300 shows the beneficiary pre-approval system receiving a request from a beneficiary or a financial institution for a trust score generated and monitored by the beneficiary pre-approval system. The method 300 is performed by a beneficiary pre-approval computing system receiving the trust score request from a beneficiary computing device (e.g., mobile device) or from a financial institution computing system. For example, the beneficiary computing device may be the beneficiary computing system 114 of FIG. 1, the beneficiary pre-approval computing system may be the beneficiary pre-approval computing system 102 of FIG. 1, and the financial institution computing system may be the financial institution computing system 112 of FIG. 1. The beneficiary pre-approval service may be one offered by the entity that operates the beneficiary pre-approval computing system 102 of FIG. 1. However, the method 300 may be similarly performed by other systems and devices. The method 300 may be performed in conjunction with the method 200 of FIG. 2.

The method 300 begins when the beneficiary pre-approval system receives a trust score query for a beneficiary at 302. The trust score query is received by the beneficiary pre-approval computing system 102 from the financial institution computing system 112 that has a funds transfer request involving the beneficiary. Additionally, the trust score query is received could be received from the beneficiary computing system 114. Generally, the trust score query is received in response to a funds transfer request to the beneficiary. The trust score query includes the beneficiary and requesting financial institution. In some arrangements, the trust score query can also be received in response a soft check or a hard check by a beneficiary on a beneficiary computing system 114. The beneficiary may request for the beneficiary's trust score both for non-transaction specific cases (e.g., a soft check) and for transaction or country specific transactions (e.g., a hard check). Additionally, the soft check can be requested by the beneficiary to determine the status of the beneficiary in order to potentially fix any issues, for example, to add a date of birth to comply with a State-specific regulation. The soft check can also be requested by the financial institution in order to determine the status of one or more beneficiaries and facilitate alerts or requests for additional information for the beneficiaries. A hard check can be requested by the beneficiary to determine the beneficiary's trust score before an actual international funds transfer occurs having similar characteristics as the hard check.

At 304, the trust score associated with the beneficiary is retrieved by the beneficiary pre-approval system. The retrieval is performed by the beneficiary pre-approval computing system 102. The retrieved trust score depends on the preferences of the requesting entity (e.g., beneficiary or financial institution). As discussed above, the trust score can be in the form of a level of confidence or as a binary response string. In arrangements where the level of confidence is selected, the requesting entity (e.g., financial institution or beneficiary) will receive a value indicative of the beneficiary's likelihood of being approved to receive funds in an international funds transfer between the beneficiary and an originator. In arrangements where the binary response string is selected, the requesting entity determines a threshold and/or characteristics of an acceptable trust score prior to transmitting the trust score query. In response to the query, a binary "pass" or "fail" (or similar binary) message is generated that is indicative of the whether the trust score associated with the beneficiary met the requesting entity's parameters of an acceptable trust score.

At 306, the trust score is transmitted by the beneficiary pre-approval system to the entity that requested the trust score. The transmission is performed by the beneficiary pre-approval computing system 102 to the financial institution computing system 112 or the beneficiary computing system 114. The trust score is formatted (e.g., binary, level of confidence, etc.) according to the preferences of the requesting entity.

In some arrangements, the beneficiary is alerted of a trust score request result at 308. The transmission of the alert is performed by the beneficiary pre-approval computing system 102 to the beneficiary computing system 114. The alert to the beneficiary may be indicative a failed funds transfer request through a financial institution. For example, a financial institution may transmit a trust score query for a real funds transfer and have a threshold trust score of 50. However, the trust score of the identified beneficiary is 42 resulting in a "failed" message being transmitted to the financial institution. This failed funds transfer generates an alert to the beneficiary including details of the failed transaction. In some arrangements, the alert is configured to request additional data based on the determined transaction type, parties, countries involved, or any other beneficiary data. For example, certain countries may require additional information to complete a given transaction, based on the transaction type, such as China requirement that a payment purpose be provided when the transaction is a payment. Thus, the alert may be generated to request a "payment purpose" from the beneficiary. Other countries and/or other transaction types also may require additional information, and the above examples should not be limited to any particular country and/or transaction type discussed herein.

Figure 4:
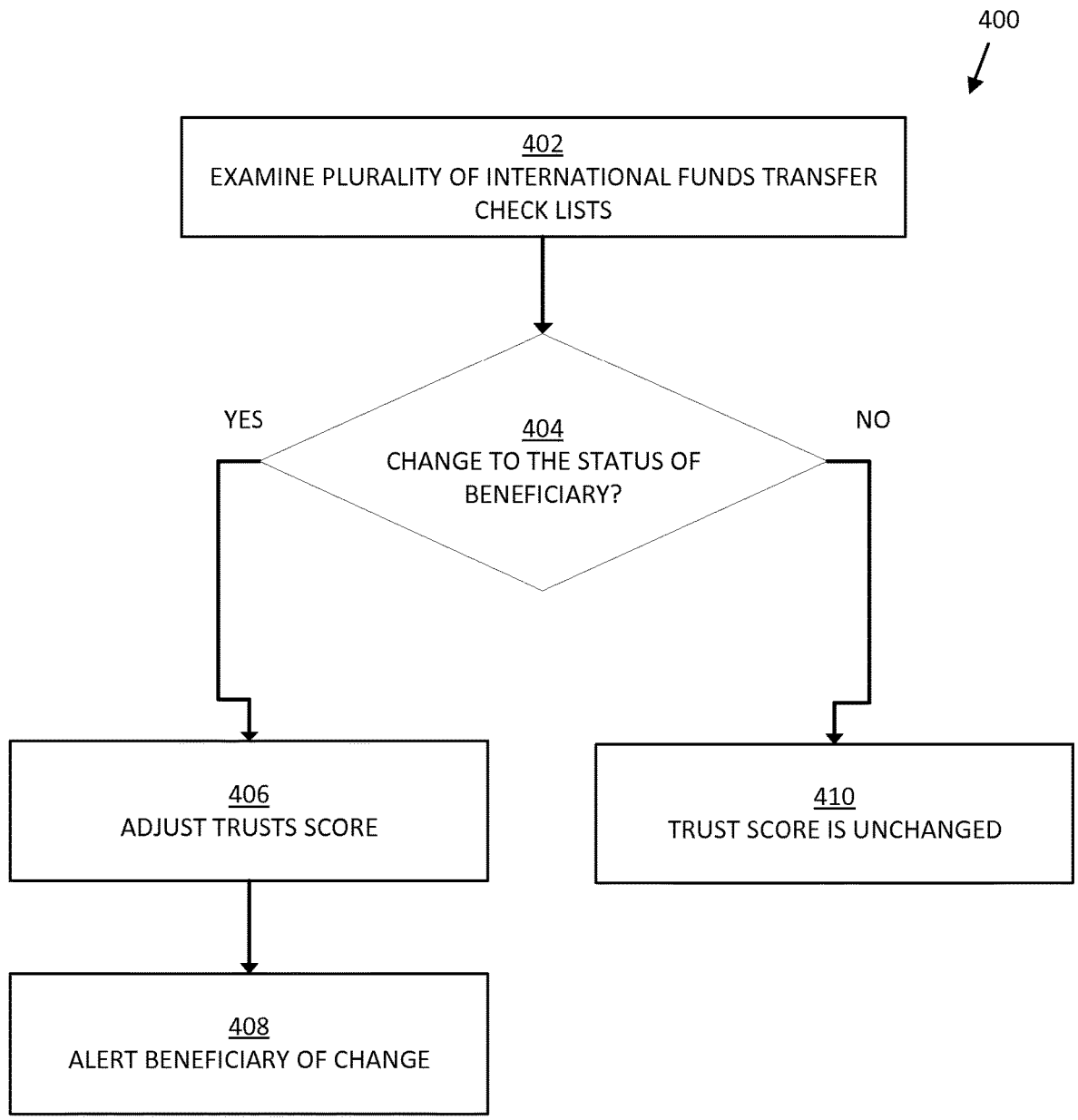
FIG. 4 is a flow diagram of a method of monitoring and adjusting a trust score of a beneficiary of the beneficiary pre-approval system, according to an example embodiment.

Referring to FIG. 4, a flow diagram of a method 400 of monitoring and adjusting a trust score of a beneficiary by the beneficiary pre-approval system is shown, according to an example embodiment. The method 400 is shown in connection with a pre-approval computing system monitoring the trust score of one or more beneficiaries. The method 400 is performed by the beneficiary pre-approval computing system 102. The beneficiary pre-approval service may be one offered by the entity that operates the beneficiary pre-approval computing system 102 of FIG. 1. However, the method 300 may be similarly performed by other systems and devices. The method 400 may be performed in conjunction with the method 200 of FIG. 2 or the method 300 of FIG. 3.

The method 400 begins with the beneficiary pre-approval system examining a plurality of international funds transfer check lists at 402. The examination is performed by the beneficiary pre-approval computing system 102. The examination may include monitoring data that is required by the beneficiary to process the requested financial transaction. The data may include country specific information, financial institution specific information, transaction specific information, and the like. For example, if the request is a payment to a recipient in India, the financial transaction request requires a purpose of payment code. The plurality of international funds transfer check lists may be similar to the plurality of international funds transfer check lists 108 of FIG. 1. The examination of the plurality of international funds transfer check lists may be done on a scheduled basis (e.g., once a week, once a day, every hour), anytime a specific beneficiary is changed on a list, or upon any change to an entry on the list.

At 404, the beneficiary pre-approval system determines whether the status of the beneficiary changed for one of more of the plurality international funds transfer check lists. The determination is performed by the beneficiary pre-approval computing system 102. This may include the beneficiary being added to a watch list, risk list, or ban list for one or more country. Additionally, the change to the status may be a result of a change in a requirement for a funds transfer request for a specific country. For example, a country could require that all future funds transfer include a payment purpose, the origin of the funds used in the payment, personally identifiable information associated with the beneficiary, and the like. If there is a change to the status of the beneficiary, the trust score is adjusted at 406. If there is no change to the status of the beneficiary, the trust score is unchanged at 410, and the monitoring cycle is completed.

At 406, the beneficiary pre-approval system adjusts the trust score of the beneficiary in response to the change of the status of the beneficiary at 404. The adjustment is performed by the beneficiary pre-approval computing system 102.

At 408, the beneficiary pre-approval system sends an alert to the beneficiary regarding the adjustment to the trust score of the beneficiary. The transmission of the alert is performed by the beneficiary pre-approval computing system 102 to the beneficiary computing system 114. In some arrangements, the alert may include a message related to the changes to the beneficiary's trust score. The message may further provide a list of reasons why the trust score changed to allow the beneficiary to correct the defects for a subsequent funds transfer. For example, a country has changes requirements and now two forms of state issued identification are required, prompting an alert and message on the beneficiary device on requirements of the additional state issued identification and the means of providing it. In some arrangements, the beneficiary will not be alerted to a change in status or failed funds transfer because the change or failure is responsive to the beneficiary being added to a "secret" list (e.g., a terrorist watch list).

Figure 5:
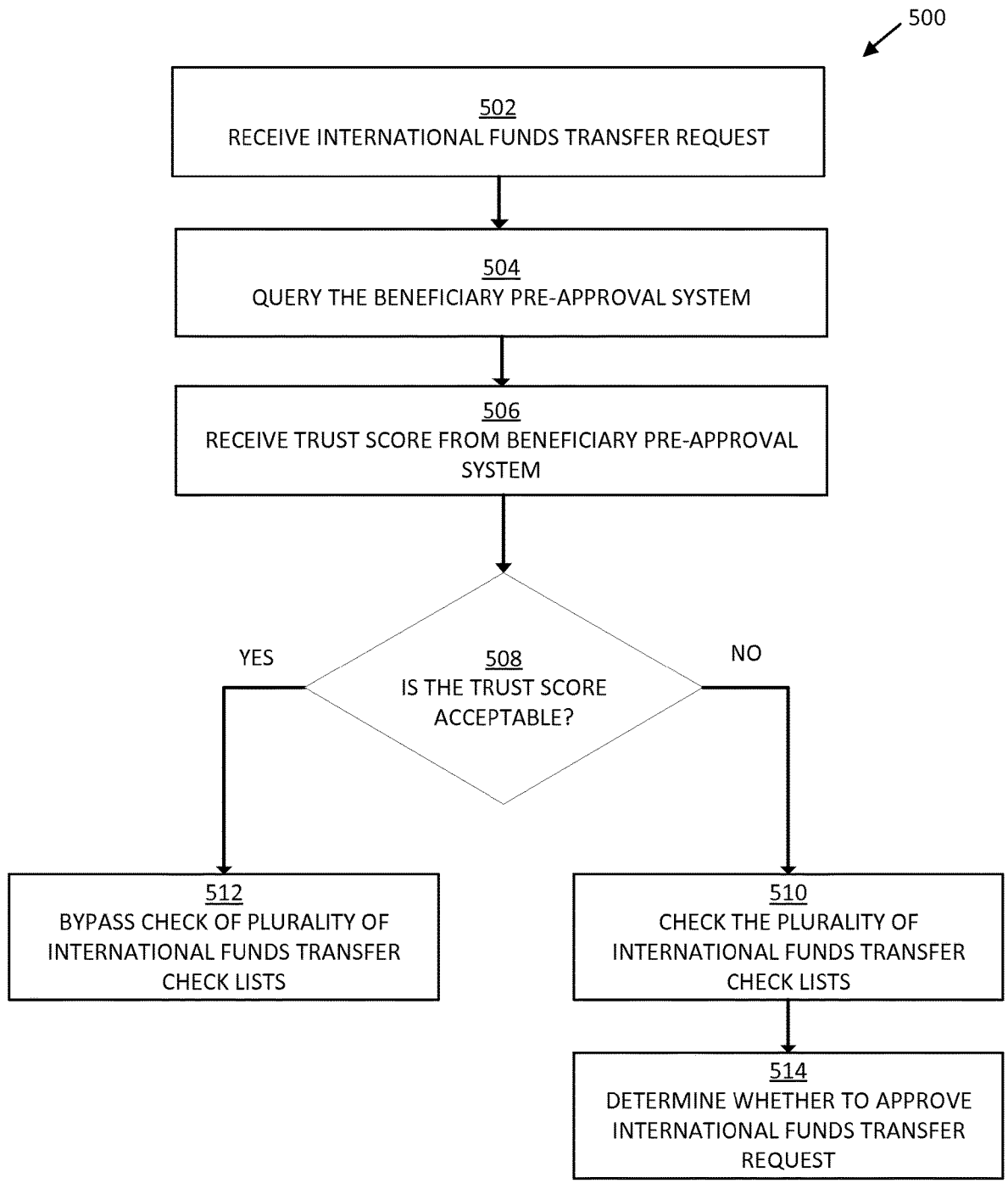
FIG. 5 is a flow diagram of a method of receiving and using a trust score of a beneficiary by a financial institution, according to an example embodiment.

Referring to FIG. 5, a flow diagram of a method 500 of receiving and using a trust score of a beneficiary by a financial institution is shown, according to an example embodiment. The method 500 is shown in connection with a financial institution requesting, receiving, and using a trust score of a beneficiary of an international funds transfer request.

The method 500 is performed by a financial institution computing system receiving trust score information from a beneficiary pre-approval computing system. For example, the beneficiary pre-approval computing system may be the beneficiary pre-approval computing system 102 of FIG. 1 and the financial institution computing system may be the financial institution computing system 112 of FIG. 1. However, the method 500 may be similarly performed by other systems and devices. The method 500 may be performed in conjunction with the method 200 of FIG. 2, method 300 of FIG. 3, or method 400 of FIG. 4.

The method 500 begins with the financial institution receiving an international funds transfer request at 502. The funds transfer request involving the beneficiary is received by the financial institution computing system 112 from a device of a customer of the financial institution. The international funds transfer request can include a transaction type, originator information, and beneficiary information. Example transaction types can include transfers of funds, transfers of other financial instruments (securities, bonds, etc.), requests for payment, credit based transactions, loan requests, invoice payments, currency swap, etc. The originator account information includes information related to the accounts involved with the transaction, such as account numbers, routing numbers, account balances, or other information related to the account of the originator to be used to process the transaction. The beneficiary information includes information related to the accounts involved with receiving the transaction, such as account numbers, routing numbers, account balances, or other information related to the identity of the beneficiary to be used to process the transaction.

At 504, the financial institution queries the beneficiary pre-approval system for the trust score related to the beneficiary of the international funds transfer request. The query is performed by the financial institution computing system 112 transmitting the request to the beneficiary pre-approval computing system 102. This includes the financial institution transmitting the international funds transfer information in the request to the beneficiary pre-approval system.

At 506, the financial institution receives the beneficiary's trust score from the beneficiary pre-approval system. The trust score receipt is performed by the financial institution computing system 112 receiving the trust score from the beneficiary pre-approval computing system 102. Depending on the preference of the financial institution, the financial institution may receive a "sliding scale" trust score indicative of the likelihood the beneficiary would pass all the plurality of international funds transfer check lists. Alternatively, and for ease of use, the financial institution may retrieve a binary result indicating that the trust score is in accordance with the preferences of the financial institution has established with the beneficiary pre-approval system in regard to "acceptable" trust scores.

At 508, the financial institution determines if the trust score is acceptable to bypass the plurality of international funds transfer check lists. The determination is performed by the financial institution computing system 112. If the financial institution received a binary result trust score at 506, the financial institution has previously determined and established a threshold and/or characteristics of an acceptable trust score with the beneficiary pre-approval system. Therefore, the financial institution receives a "pass" or "fail" (or similar binary) message indicative of the whether the trust score associated with the beneficiary met the financial institution's parameters of an acceptable trust score. If a "pass" is received the financial institution bypasses the check of the plurality of international funds transfer check lists at 512. If a "fails" is received the financial institution will conduct the check of the plurality of international funds transfer check lists at 510.

If the financial institution received a level of confidence (or similar indicator) trust score at 506, the financial institution has to determine if the trust score is acceptable to approve the international funds transfer. In some arrangements, the trust score may be associated with the number of defects associated with each funds transfer request. For example, the trust score may reflect the number of defects in a given funds transfer, such that a trust score of two would indicate that there were two defects and/or potential issues with the beneficiary. If the financial institution determines the trust score is above an acceptable threshold (e.g., the risk level of bypassing the time consuming check of the beneficiary against the plurality of international funds transfer check lists is an acceptable risk) the financial institution bypasses the check of the plurality of international funds transfer check lists at 512. If the financial institution determines the trust score is below the acceptable threshold, the financial institution will conduct the check of the plurality of international funds transfer check lists at 510.

At 510, the financial institution independently cross-references the beneficiary with the plurality of international funds transfer check lists and/or other databases used by the financial institution. The cross-referencing is performed by the financial institution computing system 112. In some arrangements, the financial institution may alert and request additional information regarding the beneficiary. For example, a country involved in the international funds transfer has changed requirements and now requires two forms of state issued identification are required. Accordingly, the financial institution may message the beneficiary to provide the additional state issued identification and instructions of how to transfer the identification to the financial institution.

Once the financial institution completes the check of the plurality of international funds transfer check lists, the financial institution determines whether to approve the international funds transfer request at 514. The determination is performed by the financial institution computing system 112.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising: registering, by a funds transfer computing system, a beneficiary to a rating system, wherein registering comprises: receiving, by the funds transfer computer system, an online request to enroll and enrollment information regarding the beneficiary, the enrollment information comprising a first biometric identifier, a number of defects data set, and a first device identifier of a computing device associated with the beneficiary, the number of defects data set generated based on data of the beneficiary and at least one of a list of government-restricted individuals and a data source comprising information regarding regulatory requirements; generating, by the funds transfer computer system, a confidence data set based on determining a degree of consistency of the enrollment information, the confidence data set being indicative of a level of confidence of a source of data of the beneficiary; generating a beneficiary enrollment based on the enrollment information; based on the number of defects data set and the confidence data set, generating, by the funds transfer computing system, a trust score for the beneficiary, wherein the trust score is indicative of the beneficiary's likelihood of being approved to receive funds in an international funds transfer between the beneficiary and a payor; generating, by the funds transfer computing system, an anonymized beneficiary identifier token, the beneficiary token being associated with the identity of the beneficiary and the beneficiary token obscuring the identity of the beneficiary; associating, by the funds transfer computing system, the anonymized beneficiary identifier token and the trust score, wherein the anonymized beneficiary identifier token keeps the identity of the beneficiary anonymous when the trust score is subsequently transmitted; and storing the trust score relationally to the anonymized beneficiary identifier token; receiving, by the funds transfer computing system, identifying information including at least one of a receiving account, a financial institution associated with the receiving account, a beneficiary location, a beneficiary name, and an authentication factor; validating, by the funds transfer computing system, the identity of the beneficiary in response to the received identifying information, comprising receiving a second biometric identifier from the computing device of the beneficiary and comparing the second biometric identifier to the first biometric identifier to ensure a match; receiving a request to complete the funds transfer transaction; when the trust score equals or exceeds a predetermined threshold value, completing the funds transfer transaction, comprising bypassing all of a predetermined international funds transfer check and sending instructions to a financial institution to complete the funds transfer transaction; and when the trust score is below the predetermined threshold value, completing the funds transfer transaction based on performing at least one predetermined international funds transfer check, and, using the anonymized beneficiary identifier token, alerting, by the funds transfer computing system, the beneficiary of the trust score, comprising: generating a pop-up notification alerting the beneficiary that the trust score is below the predetermined threshold, comprising generating a clickable prompt related to a query regarding the beneficiary; displaying the pop-up notification alerting the beneficiary that the trust score is below the predetermined threshold on a user interface associated with the computing device; receiving a second device identifier in response to the query regarding the beneficiary through the user interface; comparing the first device identifier to the second device identifier to ensure a match; and responsive to ensuring a match between the first device identifier and the second device identifier, allowing a beneficiary interaction with the clickable prompt of the pop-up notification on the user interface, wherein the beneficiary interaction with the user interface supplies additional information to generate an updated trust score or complete a funds transfer transaction.

2. The method of claim 1, wherein the beneficiary's likelihood of being approved to receive funds in an international funds transfer between the beneficiary and the payor includes clearing a plurality of international funds transfer check lists required for an international funds transfer to the beneficiary, the plurality of international funds transfer check lists including at least one of Office of Foreign Assets Control list, Bank Secrecy Act, country-specific restriction list, country-specific regulations, anti-money laundering list, and international regulations.

3. The method of claim 2, further comprising monitoring, by the funds transfer computing system, the trust score, wherein monitoring includes a periodic check into a status of the beneficiary on the plurality of international funds transfer check lists.

4. The method of claim 1, further comprising: receiving, by the funds transfer computing system, a trust score query, the trust score query in response to a funds transfer request to the beneficiary, the trust score query including the beneficiary and requesting financial institution, wherein if the trust score is above a threshold value the requesting financial institution does not independently conduct a plurality of international funds transfer check lists required for the funds transfer request to the beneficiary.

5. The method of claim 1, wherein the trust score is also indicative of at least one of beneficiary credit score, beneficiary account profile, and beneficiary fraud risk.

6. The method of claim 1, further comprising: alerting, by the funds transfer computing system, the beneficiary of an adjustment of the trust score to an adjusted trust score, comprising generating an alert that includes at least one of the adjusted trust score, information needed, and instructions to improve the adjusted trust score.

7. The method of claim 6, wherein registering the beneficiary includes an alert response login, wherein the alert response login allows for the beneficiary to securely access the alert.

8. The method of claim 7, wherein the alert response login includes at least one of a biometric of the beneficiary, a passcode, a mobile device identifier, and an electronic mail address.

9. The method of claim 1, further comprising: generating, by the funds transfer computing system, a missing information query, wherein the trust score is adjusted by retrieving the missing information query, the missing information query including at least one of transactional data, beneficiary information, beneficiary country information.

10. The method of claim 9, further comprising: transmitting, by the funds transfer computing system, the missing information query to the beneficiary; receiving, by the funds transfer computing system, a missing information response to the beneficiary; and adjusting, by the funds transfer computing system, the trust score responsive to the missing information response.

11. The method of claim 1, further comprising: associating, by the funds transfer computing system, a plurality of receiving accounts with the beneficiary, wherein the trust score is indicative of transaction history associated with each of the plurality of receiving accounts.

12. The method of claim 1, wherein generating the trust score is indicative of information corresponding to at least one of previous funds transfers related to the beneficiary, criminal record associated with the beneficiary, tax information for the beneficiary, and customer feedback associated with the beneficiary.

13. The method of claim 1, further comprising: transmitting, by the funds transfer computing system, information corresponding to the trust score to cause the trust score to be displayed on an electronic display screen.

14. A beneficiary pre-approval computing system, comprising: a storage location comprising a plurality of beneficiaries; and a processor and instructions stored in non-transitory machine-readable media, the instructions configured to cause the beneficiary pre-approval computing system to: register a beneficiary to a rating system, wherein registering comprises: receive an online request to enroll and enrollment information regarding the beneficiary, the enrollment information comprising a first biometric identifier, a number of defects data set, and a first device identifier of a computing device associated with the beneficiary; generate a confidence data set based on determining a degree of consistency of the enrollment information, the confidence data set being indicative of a level of confidence of a source of data of the beneficiary; generate a beneficiary enrollment based on the enrollment information; based on the number of defects data set and the confidence data set, generate a trust score for the beneficiary, wherein the trust score is indicative of the beneficiary's likelihood of being approved to receive funds in an international funds transfer between the beneficiary and a payor, the trust score made available in funds transfer requests related to the beneficiary, the number of defects data set generated based on data of the beneficiary and at least one of a list of government-restricted individuals and a data source comprising information regarding regulatory requirements; generate an anonymized beneficiary identifier token, the beneficiary token being associated with the identity of the beneficiary and the beneficiary token obscuring the identity of the beneficiary; associate the anonymized beneficiary identifier token and the trust score, wherein the anonymized beneficiary identifier token keeps the identity of the beneficiary anonymous when the trust score is subsequently transmitted; store the trust score relationally to the anonymized beneficiary identifier token; receive identifying information including at least one of a receiving account, a financial institution associated with the receiving account, a beneficiary location, a beneficiary name, and an authentication factor, comprising operations to receive a second biometric identifier from the computing device of the beneficiary and compare the second biometric identifier to the first biometric identifier to ensure a match; and validate the identity of the beneficiary in response to the received identifying information; receive a request to complete the funds transfer transaction; when the trust score equals or exceeds a predetermined threshold value, complete the funds transfer transaction, comprising bypassing all of a predetermined international funds transfer check and sending instructions to a financial institution to complete the funds transfer transaction; and when the trust score is below the predetermined threshold value, complete the funds transfer transaction based on performing at least one predetermined international funds transfer check, and, alert the beneficiary of the trust score using the anonymized beneficiary identifier token, comprising: generating a pop-up notification alerting the beneficiary that the trust score is below the predetermine threshold, comprising generating a clickable prompt related to a query regarding the beneficiary; displaying the pop-up notification alerting the beneficiary that the trust score is below the predetermined threshold on a user interface associated with the computing device; receiving a second device identifier in response to the query regarding the beneficiary through the user interface comparing the first device identifier to the second device identifier to ensure a match; and responsive to ensuring a match between the first device identifier and the second device identifier, allowing a beneficiary interaction with the clickable prompt of the pop-up notification on the user interface, wherein the beneficiary interaction with the user interface supplies additional information to generate an updated trust score or complete a funds transfer transaction.

15. The beneficiary pre-approval computing system of claim 14, further comprising: a network interface connected to a plurality of international funds transfer check lists, wherein the beneficiary's likelihood of being approved to receive funds in an international funds transfer between the beneficiary and the payor includes clearing the plurality of international funds transfer check lists required for an international funds transfer to the beneficiary, the plurality of international funds transfer check lists including at least one of Office of Foreign Assets Control list, Bank Secrecy Act, country-specific restriction list, country-specific regulations, anti-money laundering list, and international regulations.

16. The beneficiary pre-approval computing system of claim 15, the instructions configured to further cause the computing system to: monitor the trust score, wherein monitoring includes a periodic check into a status of the beneficiary on the plurality of international funds transfer check lists.

17. The beneficiary pre-approval computing system of claim 14, the instructions configured to further cause the computing system to: receive a trust score query, the trust score query in response to a funds transfer request to the beneficiary, the trust score query including the beneficiary and requesting financial institution, wherein if the trust score is above a threshold value the requesting financial institution does not independently conduct a plurality of international funds transfer check lists required for the funds transfer request to the beneficiary.

18. The beneficiary pre-approval computing system of claim 14, wherein the trust score is also indicative of at least one of beneficiary credit score, beneficiary account profile, and beneficiary fraud risk.

19. The beneficiary pre-approval computing system of claim 14, the instructions configured to further cause the computing system to: alert the beneficiary of an adjustment of the trust score to an adjusted trust score, comprising generating an alert that includes at least one of the adjusted trust score, information needed, and instructions to improve the adjusted trust score.

20. The beneficiary pre-approval computing system of claim 19, wherein registering the beneficiary includes an alert response login, wherein the alert response login allows for the beneficiary to securely access the alert.

21. The beneficiary pre-approval computing system of claim 20, wherein the alert response login includes at least one of a biometric of the beneficiary, a passcode, a mobile device identifier, and an electronic mail address.

22. The beneficiary pre-approval computing system of claim 14, the instructions configured to further cause the computing system to: generate a missing information query, wherein the trust score is adjusted by retrieving the missing information query, the missing information query including at least one of transactional data, beneficiary information, beneficiary country information.

23. The beneficiary pre-approval computing system of claim 22, the instructions configured to further cause the computing system to: transmit the missing information query to the beneficiary; receive a missing information response to the beneficiary; and adjust the trust score responsive to the missing information response.

24. The beneficiary pre-approval computing system of claim 14, wherein generating the trust score is indicative of the beneficiary's likelihood of being approved to receive funds originating from an originating country.

25. The beneficiary pre-approval computing system of claim 14, wherein generating the trust score is indicative of information corresponding to at least one of previous funds transfers related to the beneficiary, criminal record associated with the beneficiary, tax information for the beneficiary, and customer feedback associated with the beneficiary.

26. The beneficiary pre-approval computing system of claim 14, the instructions configured to further cause the computing system to: transmit information corresponding to the trust score to cause the trust score to be displayed on an electronic display screen.

* * * * *